US007605747B1

(12) United States Patent
Mookerjee et al.

(10) Patent No.: US 7,605,747 B1
(45) Date of Patent: Oct. 20, 2009

(54) METHOD FOR COMPENSATING FOR THE POSITIONAL ERRORS OF A SENSOR

(75) Inventors: Purusottam Mookerjee, Bridgewater, NJ (US); Jeffrey B. Boka, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 310 days.

(21) Appl. No.: 11/504,561

(22) Filed: Aug. 14, 2006

(51) Int. Cl.
*G01S 13/72* (2006.01)

(52) U.S. Cl. .............................. 342/90; 342/95; 342/97; 342/106; 342/109; 342/113; 342/115; 342/133; 342/140; 342/145; 342/146; 342/189; 342/195; 342/451

(58) Field of Classification Search ............. 342/95–97, 342/59, 90, 106–109, 113, 115, 133, 139, 342/140, 145–147, 159–162, 189, 195, 450, 342/451, 463–465
See application file for complete search history.

(56) References Cited

U.S. PATENT DOCUMENTS

| 4,489,322 | A | * | 12/1984 | Zulch et al. ................. 342/149 |
| 5,313,212 | A | * | 5/1994 | Ruzicka ....................... 342/101 |
| 6,081,230 | A | * | 6/2000 | Hoshino et al. ........ 342/357.06 |
| 6,202,033 | B1 | * | 3/2001 | Lange ......................... 702/104 |
| 6,225,942 | B1 | * | 5/2001 | Alon ............................ 342/59 |
| 6,229,479 | B1 | * | 5/2001 | Kozlov et al. .......... 342/357.06 |
| 6,829,568 | B2 | * | 12/2004 | Julier et al. ................... 702/189 |
| 6,957,072 | B2 | * | 10/2005 | Kangras et al. .......... 455/456.1 |
| 7,181,323 | B1 | * | 2/2007 | Boka et al. ..................... 701/1 |
| 7,248,206 | B1 | * | 7/2007 | Boka et al. .................... 342/90 |

OTHER PUBLICATIONS

Dhar, S. "Application of a recursive method for registration error correction in tracking with multiple sensors." Proceedings of the American Control Conference, San Francisco, CA, Jun. 1993, 869-874.*
Chansarkar, M. and Kohli, S. "Solution to a Multisensor Tracking Problem with Sensor Registration Errors." IEEE Transactions on Aerospace and Electronic Systems, vol. 35, No. 1, Jan. 1999.*
Friedland, B. "Treatment of Bias in Recursive Filtering." IEEE Transactions on Automatic Control, vol. AC-14, No. 4, Aug. 1969.*

* cited by examiner

*Primary Examiner*—Thomas H Tarcza
*Assistant Examiner*—Cassi Galt
(74) *Attorney, Agent, or Firm*—Duane Morris LLP (57) ABSTRACT

A method for determining or compensating for the positional errors of a sensor tracking a target comprises the steps of operating the sensor to generate sensed information relating to the target and adding any sensor positional bias update information to produce updated sensed information. The target state is propagated to produce time updated state estimates. The Jacobian of the state dynamics and the state transition matrix for the extended Kalman filter algorithm are computed. The covariance of a state vector is time propagated using the state transition matrix.

9 Claims, 2 Drawing Sheets

METHOD FOR COMPENSATING FOR THE POSITIONAL ERRORS OF A SENSOR

FIELD OF THE INVENTION

This invention relates to methods for determining the position and velocity states of a target when the position bias of the observing sensor is not accurately known, or for determining the location of the sensor when there is an uncertainty in the sensor location.

BACKGROUND OF THE INVENTION

Collaborative sensor coordination among the systems of a system of systems (SOS) is currently being pursued by the Missile Defense Agency (MDA) to enhance both targeting and cueing accuracies in support of ballistic missile defense. Collaborative sensor coordination requires each element of Ballistic Missile Defense System (BMDS) to register its sensor(s) to local geodetic coordinate systems in order to minimize tracking and guidance errors, thereby reducing system handover and guidance errors between the target tracking and/or cueing systems and the interceptor(s). Ultimately this "sensor registration" provides additional margin to the weapon system's pointing and divert error budgets.

Sensor registration involves mitigation of the effects of both angular and positional bias errors associated with each sensor. Angular sensor bias registration has been addressed through state augmentation in U.S. patent application Ser. No. 11/149,692, filed Jun. 10, 2005 in the name of Boka et al. and entitled "Instantaneous Multisensor Angular Bias Autoregistration" (ISAAC), and "System Calibration using Satellites (SCUS)" represented by U.S. Pat. No. 5,729,234, entitled "Remote alignment system" issued Mar. 17, 1998 in the name of Stetson et al. This system assumes that positional sensor bias registration error is not present. However, such sensor position bias registration error can exist.

Figure 1:
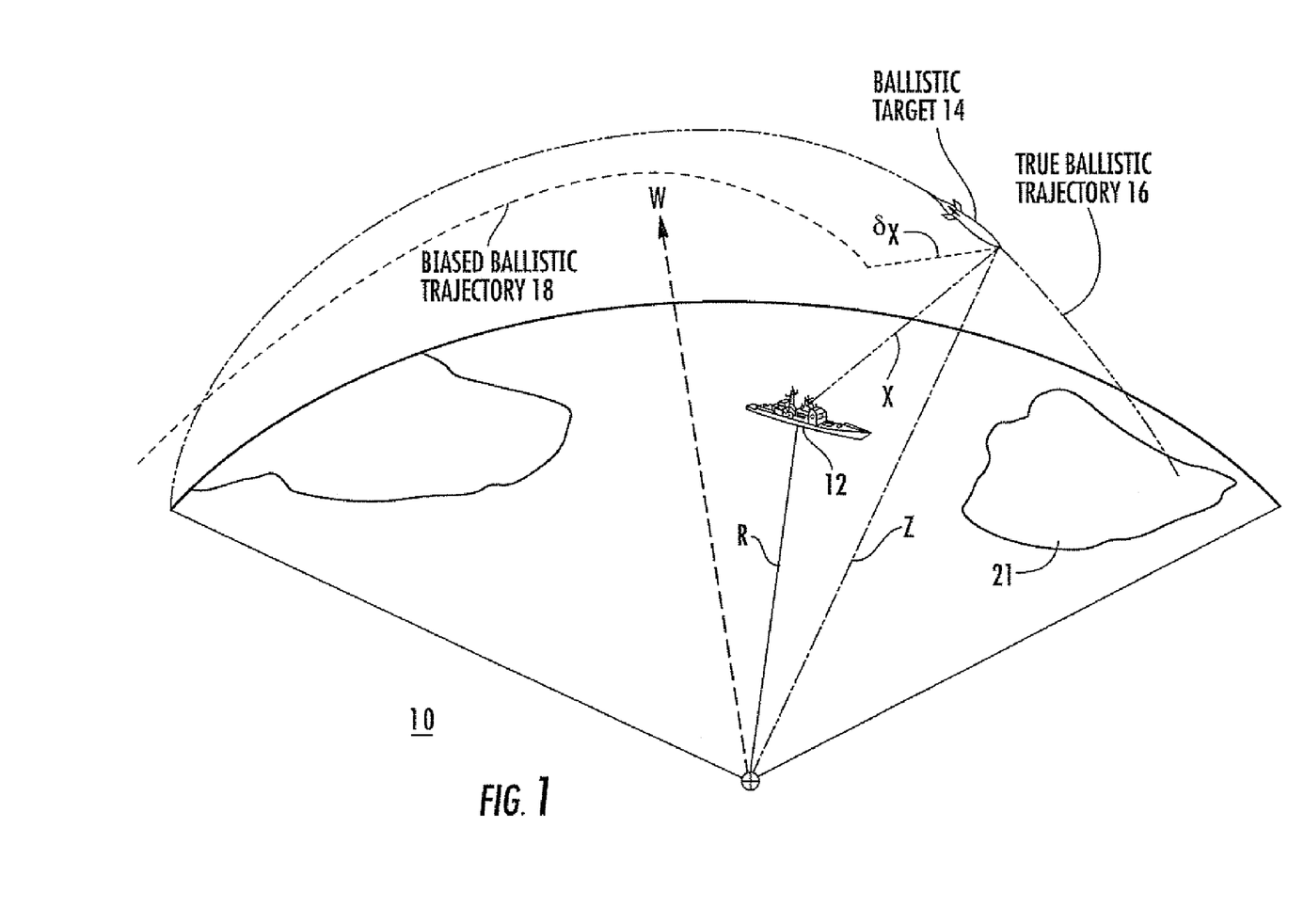
FIG. 1 is a simplified representation of a portion of the earth, showing a sensor and a target, and defining certain parameters.

FIG. 1 illustrates a scenario 10 in which a ship-borne radar system 12 lies at a radius R from the earth's center. A vector X represents a line-of-sight from the ship's radar to a target missile 14, which may be ballistic, on a true ballistic trajectory 16. A vector Z represents a position vector from the center of the earth to the target 14, and ω represents the earth rate vector. The vector δX represents the unknown sensor position bias. As a result of the bias, the measured or biased-position trajectory 18 deviates from the true position trajectory 16. The true ballistic trajectory 16 of target missile 14 extends to a land mass 21.

Current technology in positional sensor bias registration relies on the Global Positioning System (GPS) to provide an absolute positional reference that is estimated using a GPS receiver coupled with an embedded extended Kalman filter. GPS receivers are, however, susceptible to jamming and spoofing failure modes, which can ultimately corrupt the absolute positional reference estimate. These modes of GPS failures are highly probable in some wartime environments, and alternative methods for positional sensor bias registration are desired.

SUMMARY OF THE INVENTION

A method according to an aspect of the invention is for compensating for the positional errors of a sensor tracking a target with known acceleration. The method comprises the steps of operating the sensor or sensors to generate sensed information relating to the target, and adding to the sensed information any sensor positional bias update information which may be available, to thereby produce updated sensed information and therefore, provide improved target state information. The method also includes the step of propagating the target state to produce time updated state estimates comprising the target position and velocity and the positional bias of the sensor. The Jacobian of the state dynamics of the target is computed. The state transition matrix for the extended Kalman filter algorithm is computed from the Jacobian. The covariance of a state vector are time propagated using the state transition matrix. The covariance of the state transition matrix comprises the position and velocity states of the target and the positional bias of the sensor.

In a particular mode of this method, the step of propagating the state of the updated sensed information to produce time updated state estimates of the target position further comprises the step of calculating a nonlinear propagation equation making use of the Jacobian matrix.

In another mode of this method, the step of propagating the state of the updated sensed information to produce time updated state estimates of the target position further comprises the step of generating a Jacobian matrix which provides observability of the sensor positional bias [or error] through gravitation and coriolis forces.

In a particular mode of the method, the step of time propagating the covariance of the state vector of the target may comprise the step of time propagating a composite state vector, where the composite state vector comprises the position and velocity states of the target and the position bias of the sensor.

In another mode of the method, the further step is performed, after the step of time propagating the covariance of a state vector comprising the position and velocity states of the target, of determining if target position information is available, and if target position is available, performing the further step of calculating gain of the Kalman filter to generate Kalman filter gain (K). The mode may include the step of calculating $$K = P(t_i) H^T \cdot [HP(t_i) H^T + R]^{-1}$$

where:

$H = [I_{3\times3} \; 0_{3\times3} \; I_{3\times3}]$ is the measurement matrix; and R is the measurement noise covariance matrix associated with the currently reporting sensor. A yet further mode comprises, after the step of calculating gain of the Kalman filter to generate Kalman filter gain, the step of generating updates of the states of the target and of the covariance of the states of the target.

Another mode of the method further comprises, after the step of time propagating the covariance of a state vector comprising the position and velocity states of the target, the step of determining if target position and target velocity information are available, and if target position and target velocity are available, performing the further step of calculating gain of the Kalman filter to generate Kalman filter gain in accordance with $$K = P(t_i) H^T [HP(t_i) H^T + R]^{-1}$$

where:

$$H = \begin{bmatrix} I_{3\times3} & 0_{3\times3} & I_{3\times3} \\ 0_{3\times3} & I_{3\times3} & 0_{3\times3} \end{bmatrix}$$

is the measurement matrix; and

R is the measurement noise covariance matrix associated with the currently reporting sensor.

A method according to another aspect of the invention is for estimating the position of a target with the aid of a sensor, the position of which is unknown. This method comprises the steps of operating the sensor to generate sensed information relating to the position of the target, and adding to the sensed data any sensor positional bias update information to produce updated sensed information. The state of the updated sensed information is propagated to produce time updated state estimates of the target position and velocity. The Jacobian of the state dynamics of the target and the state transition matrix for the extended Kalman filter algorithm are computed. The covariance of a state vector comprising the position and velocity states of the target is time propagated to thereby produce positional error information relating to the target.

Another method for estimating the position of a sensor according to an aspect of the invention comprises the step of operating a sensor to generate sensed data relating to a target, where the data are contaminated by sensor positional bias errors. The method also includes the step of adding to the sensed data any sensor positional bias update information to produce updated sensed information. The state of the updated sensed information is propagated to produce time updated state estimates of the target position and velocity. The Jacobian of the state dynamics of the target and the state transition matrix for the extended Kalman filter algorithm are computed. The covariance of a state vector comprising the position and velocity states of the target is time propagated.

A method according to another aspect of the invention is for estimating the error in the position of a sensor. The method comprises the steps of operating a sensor to generate data relating to a target, where the data are contaminated by sensor positional bias errors. The method comprises the steps of operating the sensor to generate sensed information relating to the target, and adding to the sensed data any sensor positional bias update information to produce updated sensed information. The state of the updated sensed information is propagated to produce time updated state estimates of the target position and velocity. The Jacobian of the state dynamics of the target is computed, as is the state transition matrix for the extended Kalman filter algorithm. The covariance of a state vector comprising the position and velocity states of the target is time propagated to thereby produce positional error information relating to the target.

DESCRIPTION OF THE INVENTION

In general, the invention relates to a system called "Geo-Positional Sensor Level EStimation System" (GPSLESS). GPSLESS is a ballistic target track state estimator that incorporates an extended Kalman filter algorithm with an embedded real-time sensor registration estimator that estimates the positional sensor registration bias error. The intent is not to replace the GPS systems, but rather, GPSLESS provides a positional reference alternative, which may be used during GPS down times due to unavailability, jamming, or spoofing; or which may be used as a supplement to GPS. In some aspects of the invention, GPSLESS provides real-time updates to the positional bias registration error, while at the same time providing an enhanced ballistic track state estimate, unencumbered by positional registration bias errors. In other aspects, GPSLESS achieves positional sensor registration relative to the local geodetic coordinate frame for systems where the target acceleration is known, e.g. ballistic target. In the case of a ballistic target, error in the gravity acceleration vector as a result of using the erroneous target position vector manifests itself as a position error. According to one general aspect of the invention, the GPSLESS filter incorporates a dynamics algorithm that estimates the positional bias along the gravity vector, and also the bias along the coriolis acceleration vector, thereby, at least in theory, providing observability of the total registration positional bias error.

Figure 2:
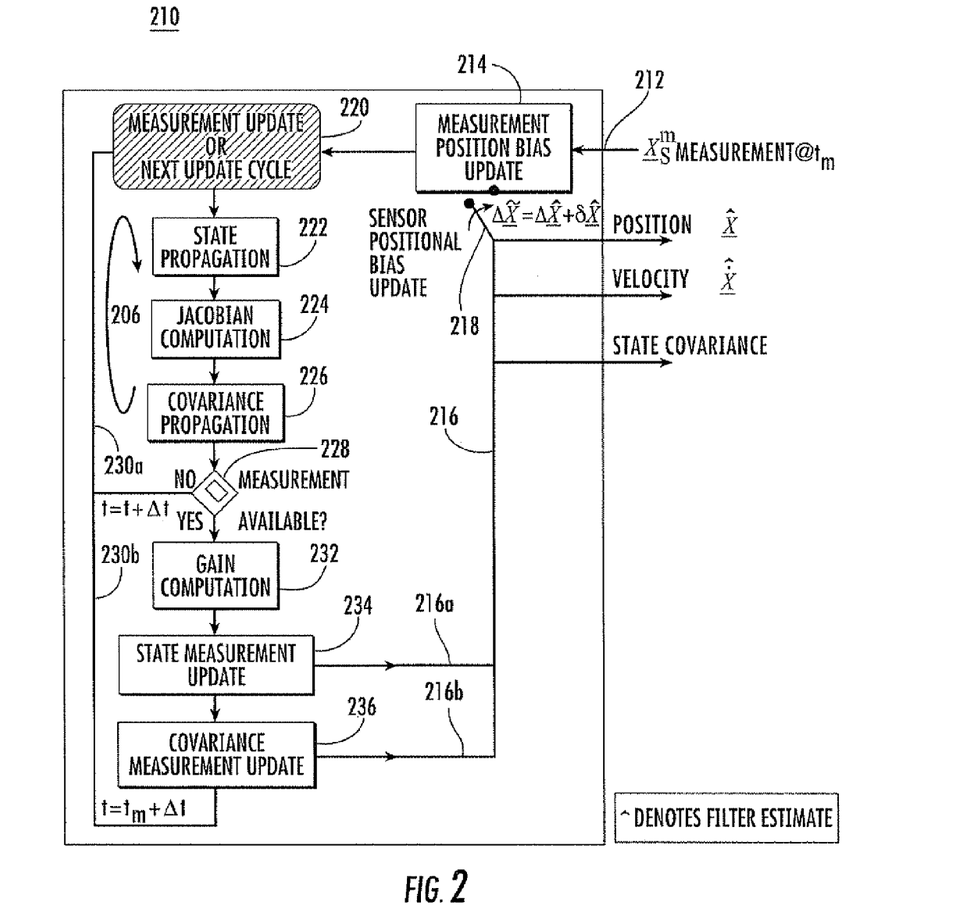
FIG. 2 is a simplified logic flow chart or diagram illustrating logic flow according to an aspect of the invention.

FIG. 2 is a simplified logic flow chart or diagram illustrating a system according to an aspect of the invention. The GPSLESS process begins with an initial position measurement $\underline{X}_S^m$ at a time $t_m$ from a sensor (not illustrated in FIG. 2) tracking a ballistic target. In order to develop the filter equations, a model is assumed in which the target is either ballistic (falling under the force of gravity) or else the specific force (i.e. thrust acceleration) is known exactly and can be compensated for. Additionally, due to the high altitudes at which target tracking occurs, it is assumed that atmospheric drag effects are negligible or can be properly compensated for. Given these assumptions, the following equations describe the model used for the target kinematics:

$$\underline{\ddot{X}} = \frac{-\mu \underline{Z}}{|\underline{Z}|^3} + \underline{A} - \underline{\omega} \times (\underline{\omega} \times \underline{Z}) - 2\underline{\omega} \times \underline{\dot{X}} \quad (1)$$

$$\underline{Z} = \underline{L} + \underline{X}$$

where:
  μ is the Earth gravitational constant; and
  $\underline{A}$ is the known specific force which includes (but is not limited to) effects such as higher order gravitational effects.

For simplicity of explanation, and without loss of generality, the remaining description omits the $\underline{A}$ term for conciseness and includes only the dominant gravity term μ. It is further assumed that the uncertainty (covariance statistics) in the location $\underline{L}$ of the reporting sensor is known.

The initial position measurement $X_S^m$ represented by path 212 at a time $t_m$ is applied to a measurement bias update block 214 of FIG. 2 represented by 210. If previous iterations of the logic of FIG. 2 have occurred, there may already be a provisional position bias estimate available on path 216 which can be coupled by the switch function illustrated as 218 to the measurement position bias update block 214. The provisional position bias estimate is given as $\Delta \underline{\tilde{X}} = \Delta \underline{\hat{X}} + \delta \hat{X}$, where the tilde ~ represents the update and the caret represents an estimate. Measurement position bias update block 214 corrects the initial position measurement at time $t_m$ for any known positional biases in the position of the target. The measurement position bias update function 214 applies the nominal sensor position bias correction $\Delta \hat{x}$ and the sensor position bias estimate update $\delta \hat{x}$ from the previous bias estimation cycle. From block 214, the logic flows to a Measurement Update or Next Update Cycle block 220, which represents a determination as to whether the state and covariance estimates for the current time iteration will include a measurement update. Nominally, the logic of FIG. 2 will operate at a predetermined cycle rate, with measurement updates occurring asynchronously as they become available.

The state vector $\underline{s}$ is:

$$\underline{s} = \left\{ \begin{array}{c} \underline{X} \\ \underline{\dot{X}} \\ \delta\underline{X} \end{array} \right\} \quad (2)$$

State vector $\underline{s}$ includes target position, velocity, and positional registration biases for all reporting sensors. Position and velocity vector are referenced to a non-inertial reference frame such as Earth-centered Earth-Fixed (ECEF). The positional registration bias state vector $\delta\underline{X}$ represents the sensor position bias with respect to the ECEF coordinates.

The dynamics equations (i.e. the nonlinear state derivative equations) are set forth in equation (3). These equations are based on the assumed target kinematics described in relation to equation (1). Additionally, it is assumed that all positional sensor registration biases are constant.

$$\underline{\dot{s}} = \left\{ \begin{array}{c} \underline{\dot{X}} \\ \underline{\ddot{X}} \\ \delta\underline{\dot{X}} \end{array} \right\} = \left\{ \begin{array}{c} \underline{\dot{X}} \\ \frac{-\mu\underline{Z}}{|\underline{Z}|^3} - \underline{\omega}\times(\underline{\omega}\times\underline{Z}) - 2\underline{\omega}\times\underline{\dot{X}} \\ \underline{0}_{3\times 1} \end{array} \right\} \quad (3)$$

From block 220 of FIG. 2, the logic flows to a State Propagation function represented by a block 222, for propagating the state estimates to produce time updated state estimates of the target position and velocity. Time propagation of the state vector is performed by numerically integrating the state derivative vector from the previous time $t_{i-1}$ to the current time $t_i$ where the subscript i refers to the filter cycle iteration:

$$\hat{\underline{s}}(t_i) = \hat{\underline{s}}(t_{i-1}) + \int_{t_{i-1}}^{t_{i-1}+\Delta t} \hat{\underline{\dot{s}}}(\tau) d\tau \quad (4)$$

For the integration process, a high order numerical integration algorithm, such as the $2^{nd}$ order or $4^{th}$ order Runge Kutta algorithm might be used. The incremental time step $\Delta t$ refers to either the nominal update cycle time or the incremental time step from the last cycle time to the current measurement time $t_m$ (i.e., $\Delta t = t_m - t_{i-1}$). At the first iteration, the state propagation function of block 222 also initializes the state for the subsequent iterations. From state propagation block 222, the logic of FIG. 2 flows to a further Jacobian computation block 224.

The Jacobian computation block 224 of FIG. 2 computes the Jacobian of the state dynamics of the target, and subsequently computes, from the Jacobian of the state dynamics of the target, the state transition matrix for the GPSLESS extended Kalman filter algorithm. The Jacobian J is given by $$J = \left[\frac{\partial\underline{\dot{s}}}{\partial\underline{s}}\right] = \left[\frac{\partial\underline{\dot{s}}}{\partial\underline{X}} \frac{\partial\underline{\dot{s}}}{\partial\underline{\dot{X}}} \frac{\partial\underline{\dot{s}}}{\partial\delta\underline{X}}\right] = \begin{bmatrix} 0_{3\times3} & I_{3\times3} & 0_{3\times3} \\ \frac{\partial\underline{\ddot{X}}}{\partial\underline{X}} & \frac{\partial\underline{\ddot{X}}}{\partial\underline{\dot{X}}} & \frac{\partial\underline{\ddot{X}}}{\partial\delta\underline{X}} \\ 0_{3\times3} & 0_{3\times3} & 0_{3\times3} \end{bmatrix} \quad (5)$$

where $$\frac{\partial\underline{\ddot{X}}}{\partial\underline{X}} = -\frac{\mu}{(\hat{\underline{Z}}\cdot\hat{\underline{Z}})^{\frac{3}{2}}}\left[I_{3\times3} - \frac{3}{(\hat{\underline{Z}}\cdot\hat{\underline{Z}})}[\hat{\underline{Z}}\cdot\hat{\underline{Z}}^T]\right] - [\![\hat{\underline{\omega}}]\!]\cdot[\![\hat{\underline{\omega}}]\!]$$

$$\frac{\partial\underline{\ddot{X}}}{\partial\underline{\dot{X}}} = -2\cdot[\![\hat{\underline{\omega}}]\!]$$

$$\frac{\partial\underline{\ddot{X}}}{\partial\delta\underline{X}} = 0_{3\times3}$$

The $[\![\cdot]\!]$ notation denotes a skew symmetric matrix of the vector argument.

The state transition matrix used for the time propagation of the error covariance can be approximated as:

$$\Phi \approx I + J\Delta t + 0.5 J^2 \Delta t^2 \quad (6)$$

From Jacobian computation block 224, the logic of FIG. 2 flows to a block 226, which represents the use of the state transition matrix to time propagate the covariance of a state vector comprising the position and velocity states of the target. The covariance propagation function performed by block 226 is the traditional Kalman filter time propagation of the state covariance matrix utilizing the state transition matrix. This function will nominally operate faster than the measurement processing to reduce non-linear effects when measurement updates occur at slow update rates. At the first iteration, the covariance propagation function of block 226 also initializes the state covariance for the subsequent iterations. Time propagation of the error covariance matrix P is performed with the following equation:

$$P(t_i) = \Phi P(t_{i-1})\Phi^T + Q \quad (7)$$

where:
Q is the state noise matrix.

The state noise matrix may be determined using the equation $$Q = \int_0^{\Delta t} \Phi W \Phi^T d\tau \quad (8)$$

Where:

$W = E(\underline{w}(\tau)\underline{w}(\tau)^{(T)})$; and $\underline{w}(\tau)$ is the 9×1 state white noise vector.

From block 226 of FIG. 2, the logic flows to a decision block 228. Decision block 228 determines if a position measurement is currently available. If a measurement is not currently available, then time is incremented by the nominal $\Delta t$ propagation time rate, the logic leaves decision block 228 by the "No" output, and control is passed to the start of the iteration loop 206 by way of a path 230a. If, on the other hand, a measurement is available, then the logic of FIG. 2 leaves decision block 228 by the "Yes" output, and proceeds to a block 232, representing a gain computation.

The gain computation block 232 constructs the standard Kalman filter gain matrix using the measurement matrix and the error covariance matrix $$K = P(t_i)H^T[HP(t_i)H^T + R]^{-1} \quad (9)$$

where:

$$H = [I_{3\times3} 0_{3\times3} I_{3\times3}] \quad (10)$$

is the measurement matrix; and

R is the measurement noise covariance matrix associated with the currently reporting sensor It should be noted that the gain computation expressed by equations (9) and (10) is applicable only in the case in which the measurement update is of the target position only. If the measurement update includes both target position and target velocity information, the gain of the Kalman filter is generated in accordance with equation (9) with the measurement matrix H redefined as $$H = \begin{bmatrix} I_{3\times 3} & 0_{3\times 3} & I_{3\times 3} \\ 0_{3\times 3} & I_{3\times 3} & 0_{3\times 3} \end{bmatrix} \quad (11)$$

and including the effect of the velocity in the second row.

From gain computation block 232, the logic of FIG. 2 flows to a block 234, representing the state measurement and state residuals update including the sensor registration bias estimate. The state vector is updated using $$\underline{\hat{s}} = \underline{\hat{s}} + K \cdot \Delta \underline{m} \quad (13)$$

where the measurement residual $\Delta \underline{m}$ is defined as $$\Delta \underline{m} = \underline{X}_s{}^m(t_i) - H \cdot \underline{s} \text{ and}$$

$$\Delta \underline{\tilde{x}} = \Delta \underline{\hat{x}} + \delta \underline{\hat{x}}$$

The updated state measurements are made available by way of paths 216a and 216 to sensor positional bias update switch function 218, for inclusion in the next iteration. From block 234, the logic flows to a further block 236, representing the updating of the covariance measurement. The covariance measurement update function of block 236 performs the measurement update of the state covariance matrix $$P(t_i) = (I - KH)P(t_i)(I - KH)^T + KRK^T \quad (14)$$

which is made available by way of paths 216b and 216 to the switching function 218 for updating the measurements.

The state vector and covariance are output from the algorithm through 216 by way of paths 216a and 216b. At the end of each tracking event, the sensor positional bias is updated using $\Delta \underline{\tilde{x}} = \Delta \underline{\hat{x}} + \delta \underline{\hat{x}}$ and is used as the starting sensor position bias for the next tracking event. Control is passed to the start of the iteration loop 206 by way of a path 230b.

A method (210) according to an aspect of the invention is for compensating for the positional errors of a sensor (12) tracking a target (14) with known acceleration. The method (210) comprises the steps of operating the sensor (12) or sensors to generate sensed information relating to the target (14), and adding (214) to the sensed information any sensor (12) positional bias update information which may be available, to thereby produce updated sensed information. The updated sensed information provides improved or updated target state information. The method (210) also includes the step of propagating (222) the target (14) state to produce time updated state estimates comprising the target (14) position and velocity and the positional bias of the sensor (12). The Jacobian of the state dynamics of the target (14) are computed (224). The state transition matrix for the extended Kalman filter algorithm is computed from the Jacobian (224, Equation 6). The covariance of a state vector is time propagated (226) using the state transition matrix. The covariance of the state transition matrix comprises the position and velocity states of the target (14) and the positional bias of the sensor (12).

In a particular mode of this method (210), the step of propagating the state of the updated sensed information (222) to produce time updated state estimates of the target (14) position further comprises the step of calculating a nonlinear propagation equation (Equation 3).

In another mode of this method (210), the step (222) of propagating the state of the updated sensed information to produce time updated state estimates of the target (14) position further comprises the step of generating a Jacobian matrix (block 224, Equation 5) which provides observability of the sensor (12) positional bias [or error] through gravitation and coriolis forces.

In a particular mode of the method (210), the step (226) of time propagating the covariance of the state vector of the target (14) may comprise the step of time propagating a composite state vector (2), where the composite state vector comprises the position and velocity states of the target (14) and the position bias of the sensor (12).

In another mode of the method (210), the further step is performed (228), after the step (226) of time propagating the covariance of a state vector comprising the position and velocity states of the target (14), of determining if target (14) position information is available, and if target (14) position is available, performing the further step (232) of calculating gain of the Kalman filter to generate Kalman filter gain (K). The mode may include the step of calculating $$K = P(t_i)H^T[HP(t_i)H^T + R]^{-1}$$

where:

$H = [I_{3\times 3} \ 0_{3\times 3} \ I_{3\times 3}]$ is the measurement matrix; and R is the measurement noise covariance matrix associated with the currently reporting sensor (12). A yet further mode of the method further comprises, after the step (232) of calculating gain of the Kalman filter to generate Kalman filter gain, the step (234, 236) of generating updates of the states of the target (14) and of the covariance of the states of the target (14).

Another mode of the method (210) further comprises, after the step (226) of time propagating the covariance of a state vector comprising the position and velocity states of the target (14), the step (228) of determining if target (14) position and target (14) velocity information are available, and if target (14) position and target (14) velocity are available, performing the further step (232) of calculating gain of the Kalman filter to generate Kalman filter gain in accordance with $$K = P(t_i)H^T[HP(t_i)H^T + R]^{-1}$$

where:

$$H = \begin{bmatrix} I_{3\times 3} & 0_{3\times 3} & I_{3\times 3} \\ 0_{3\times 3} & I_{3\times 3} & 0_{3\times 3} \end{bmatrix}$$

is the measurement matrix; and

R is the measurement noise covariance matrix associated with the currently reporting sensor (12).

A method (210) according to another aspect of the invention is for estimating the position of a target (14) with the aid of a sensor (12), the position of which is unknown. This method (210) comprises the steps of operating the sensor (12) to generate sensed information relating to the position of the target (14), and adding (214) to the sensed data any sensor (12) positional bias update information to produce updated sensed information. The state of the updated sensed information is propagated (222) to produce time updated state estimates of the target (14) position and velocity. The Jacobian of the state dynamics of the target (14) and the state transition matrix for the extended Kalman filter algorithm are computed (224). The covariance of a state vector comprising the position and velocity states of the target (14) is time propagated (226) to thereby produce positional error information relating to the target (14).

Another method (210) for estimating the position of a sensor (12) according to an aspect of the invention comprises the step of operating a sensor (12) to generate sensed data relating to a target (14), where the data are contaminated by sensor (12) positional bias errors. The method (210) also includes the step (214) of adding to the sensed data any sensor (12) positional bias update information to produce updated sensed information. The state of the updated sensed information is propagated (222) to produce time updated state estimates of the target (14) position and velocity. The Jacobian of the state dynamics of the target (14) and the state transition matrix for the extended Kalman filter algorithm are computed (224). The covariance of a state vector comprising the position and velocity states of the target (14) is time propagated (226).

A method (210) according to another aspect of the invention is for estimating the error in the position of a sensor (12). The method (210) comprises the steps of operating a sensor (12) to generate data relating to a target (14), where the data are contaminated by sensor (12) positional bias errors. The method (210) comprises the steps of operating the sensor (12) to generate sensed information relating to the target (14), and adding (214) to the sensed data any sensor (12) positional bias update information to produce updated sensed information. The state of the updated sensed information is propagated (222) to produce time updated state estimates of the target (14) position and velocity. The Jacobian of the state dynamics of the target (14) is computed (224), as is the state transition matrix for the extended Kalman filter algorithm. The covariance of a state vector comprising the position and velocity states of the target (14) is time propagated (226) to thereby produce positional error information relating to the target (14).

What is claimed is:

1. A method for compensating for the positional errors of a sensor tracking a target with known acceleration, said method comprising the steps of:

operating said sensor to generate sensed information relating to the target;

adding to said sensed information any sensor positional bias update information to produce updated sensed information which ultimately provides improved target state information;

propagating the target state to produce time updated state estimates comprising the target position and velocity and the positional bias of the sensor;

computing the Jacobian of the state dynamics vector of the target;

computing, from said Jacobian, the state transition matrix for the extended Kalman filter algorithm; and using said state transition matrix, time propagating the covariance of a state vector comprising the position and velocity states of said target and the positional bias of the sensor.

2. A method according to claim 1, wherein said step of propagating the state of said updated sensed information to produce time updated state estimates of the target position further comprises the step of:

generating a state derivative vector; and numerically integrating the state derivative vector.

3. A method according to claim 1, wherein said step of computing the Jacobian of the state dynamics of the target further comprises the step of:

taking partial derivatives of the state dynamics vector with respect to the states which provide observability of the sensor positional bias error through gravitation and coriolis forces.

4. A method according to claim 1, wherein said step of time propagating the covariance of the state vector of said target comprises the step of:

generating a state transition matrix using the Jacobian matrix to time propagate the covariance of the state vector, where said state vector comprises the position and velocity states of said target and the position bias of said sensor.

5. A method according to claim 1, further comprising, after said step of time propagating the covariance of a state vector comprising the position and velocity states of said target and the position bias of said sensor, the step of determining if target position information is available, and if target position is available, performing the further steps of:

calculating gain of the Kalman filter to generate Kalman filter gain.

6. A method according to claim 5, wherein said step of calculating gain of the Kalman filter to generate Kalman filter gain comprises the step of calculating $$K=P(t_i)H^T[HP(t_i)H^T+R]^{-1}$$

where:

$H=[I_{3\times3}\ 0_{3\times3}\ I_{3\times3}]$ is the measurement matrix; and

R is the measurement noise covariance matrix associated with the currently reporting sensor.

7. A method according to claim 5, further comprising, after said step of calculating gain of the Kalman filter to generate Kalman filter gain, the steps of:

generating updates of the states of said target and of the covariance of said states of said target.

8. A method according to claim 1, further comprising, after said step of time propagating the covariance of a state vector comprising the position and velocity states of said target, the step of determining if target position and target velocity information are available, and if target position and target velocity are available, performing the further steps of:

calculating gain of the Kalman filter to generate Kalman filter gain in accordance with $$K=P(t_i)H^T[HP(t_i)H^T+R]^{-1}$$

where:

$$H = \begin{bmatrix} I_{3\times3} & 0_{3\times3} & I_{3\times3} \\ 0_{3\times3} & I_{3\times3} & 0_{3\times3} \end{bmatrix}$$

is the measurement matrix; and

R is the measurement noise covariance matrix associated with the currently reporting sensor.

9. A method for compensating for the positional errors of a sensor tracking a target with known acceleration, said method comprising the steps of:

defining the estimator state given by $$s = \begin{Bmatrix} \underline{X} \\ \underline{\dot{X}} \\ \delta \underline{X} \end{Bmatrix}$$

comprising the target position $\underline{X}$ and velocity $\underline{\dot{X}}$ and the positional bias $\delta\underline{X}$ of the sensor;

operating said sensor to generate sensed information $\underline{Z}$ relating to the target according to $\underline{Z}=\underline{L}+\underline{X}$ where $\underline{L}$ is the location of the reporting sensor;

adding to said sensed information any sensor positional bias update information $\Delta\underline{\tilde{X}}=\Delta\underline{\hat{X}}+\delta\underline{\hat{X}}$, where $\Delta\underline{\hat{X}}$ is the position bias estimate from the previous cycle, $\Delta\underline{\tilde{X}}$ is the position bias estimate from the current cycle, and $\delta\hat{X}$ is the position bias error estimate, where the tilde ~ represents the update and the caret ^ represents an estimate, to produce updated sensed information which ultimately provides improved target state estimates;

propagating from the previous time $t_{i-1}$ to the current time $t_i$ where the subscript i refers to the filter cycle iteration to produce time updated state estimates according to $$\hat{s}(t_i) = \hat{s}(t_{i-1}) + \int_{t_{i-1}}^{t_{i-1}+\Delta t} \hat{\dot{s}}(\tau) d\tau;$$

computing the Jacobian of the state dynamics of the target according to $$J = \left[\frac{\partial \dot{s}}{\partial s}\right] = \left[\frac{\partial \dot{s}}{\partial \underline{X}} \; \frac{\partial \dot{s}}{\partial \underline{\dot{X}}} \; \frac{\partial \dot{s}}{\partial \delta \underline{X}}\right] = \begin{bmatrix} 0_{3\times3} & I_{3\times3} & 0_{3\times3} \\ \frac{\partial \underline{\ddot{X}}}{\partial \underline{X}} & \frac{\partial \underline{\ddot{X}}}{\partial \underline{\dot{X}}} & \frac{\partial \underline{\ddot{X}}}{\partial \delta \underline{X}} \\ 0_{3\times3} & 0_{3\times3} & 0_{3\times3} \end{bmatrix}$$

where $$\frac{\partial \underline{\ddot{X}}}{\partial \underline{X}} = -\frac{\mu}{(\hat{Z}\cdot\hat{Z})^{\frac{3}{2}}}\left[I_{3\times3} - \frac{3}{(\hat{Z}\cdot\hat{Z})}[\hat{Z}\cdot\hat{Z}^T]\right] - [\![\hat{\omega}]\!]\cdot[\![\hat{\omega}]\!]$$

$$\frac{\partial \underline{\ddot{X}}}{\partial \underline{\dot{X}}} = -2\cdot[\![\hat{\omega}]\!]$$

$$\frac{\partial \underline{\ddot{X}}}{\partial \delta \underline{X}} = 0_{3\times3}$$

and the $[\![\cdot]\!]$ notation denoting a skew symmetric matrix of the vector argument;

computing, from said Jacobian, the state transition matrix for the extended Kalman filter algorithm $$\Phi \approx I + J\Delta t + 0.5 J^2 \Delta t^2;$$

and using said state transition matrix, time propagating the covariance of a state vector comprising the position and velocity states of said target and the positional bias of the sensor given by $$P(t_i) = \Phi P(t_{i-1})\Phi^T + Q,$$

where Q is the state noise matrix.

\* \* \* \* \*

UNITED STATES PATENT AND TRADEMARK OFFICE
CERTIFICATE OF CORRECTION

PATENT NO.       : 7,605,747 B1                                         Page 1 of 1
APPLICATION NO. : 11/504561
DATED            : October 20, 2009
INVENTOR(S)      : Mookerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,605,747 B1  
APPLICATION NO. : 11/504561  
DATED : October 20, 2009  
INVENTOR(S) : Purusottam Mookerjee et al.

It is certified that error appears in the above-identified patent and that said Letters Patent is hereby corrected as shown below:

In Column 1, line 3 please insert the following:

-- GOVERNMENTAL INTEREST

This invention was made with Government support under Contract N00024-03-C-6110 awarded by the Department of the Navy. The Government has certain rights in this invention. --

Signed and Sealed this
Seventeenth Day of July, 2012

David J. Kappos
*Director of the United States Patent and Trademark Office*